(12) United States Patent
Lee

(10) Patent No.: US 8,797,921 B2
(45) Date of Patent: Aug. 5, 2014

(54) COMMUNICATION TERMINAL AND METHOD FOR DATA TRANSMISSION

(75) Inventor: Hyung Chul Lee, Seoul (KR)

(73) Assignee: Pantech Co., Ltd., Seoul (KR)

( * ) Notice: Subject to any disclaimer, the term of this patent is extended or adjusted under 35 U.S.C. 154(b) by 699 days.

(21) Appl. No.: 12/860,560

(22) Filed: Aug. 20, 2010

(65) Prior Publication Data

US 2011/0188483 A1    Aug. 4, 2011

(30) Foreign Application Priority Data

Jan. 29, 2010  (KR) ........................ 10-2010-0008321

(51) Int. Cl.
*H04B 7/005* (2006.01)
*G06F 15/16* (2006.01)

(52) U.S. Cl.
USPC .......................................... 370/278; 370/248

(58) Field of Classification Search
USPC ................................................ 370/310–350
See application file for complete search history.

(56) References Cited

U.S. PATENT DOCUMENTS

| | | | |
|---|---|---|---|
| 5,614,914 A | | 3/1997 | Bolgiano et al. |
| 5,929,848 A * | | 7/1999 | Albukerk et al. ............. 715/700 |
| 6,377,296 B1 * | | 4/2002 | Zlatsin et al. ................ 348/143 |
| 6,738,631 B1 * | | 5/2004 | Adler et al. ................ 455/456.6 |
| 6,957,045 B2 * | | 10/2005 | Haller et al. ................ 455/41.1 |
| 7,346,705 B2 * | | 3/2008 | Hullot et al. ................ 709/238 |
| 7,660,431 B2 * | | 2/2010 | Crenshaw .................... 382/100 |
| 7,707,239 B2 * | | 4/2010 | Anderson et al. ............ 709/202 |
| 8,275,414 B1 * | | 9/2012 | Athsani et al. ................ 455/557 |
| 8,301,159 B2 * | | 10/2012 | Hamynen et al. .......... 455/456.1 |
| 2001/0034222 A1 * | | 10/2001 | Roustaei et al. ............. 455/403 |
| 2004/0062220 A1 * | | 4/2004 | Bolgiano et al. ............. 370/334 |
| 2004/0184414 A1 * | | 9/2004 | Ohki et al. .................... 370/260 |
| 2006/0069809 A1 * | | 3/2006 | Serlet ........................... 709/248 |
| 2006/0242206 A1 * | | 10/2006 | Brezak et al. ................ 707/201 |
| 2007/0019682 A1 * | | 1/2007 | Krzyzanowski .............. 370/503 |
| 2007/0230703 A1 * | | 10/2007 | Barrus et al. ................. 380/277 |
| 2008/0320172 A1 * | | 12/2008 | Kruglikov et al. ........... 709/248 |
| 2011/0081088 A1 * | | 4/2011 | Xiao ............................. 382/218 |

FOREIGN PATENT DOCUMENTS

| | | |
|---|---|---|
| CN | 001659904 | 8/2005 |
| EP | 1 752 985 | 2/2007 |
| JP | 2002-325061 | 11/2002 |
| JP | 2005-159821 | 6/2005 |
| JP | 2005-192098 | 7/2005 |
| JP | 2005-524362 | 8/2005 |
| JP | 2007-053424 | 3/2007 |
| JP | 2007-243977 | 9/2007 |
| KR | 10-0437157 | 6/2004 |
| KR | 10-0594127 | 6/2006 |

(Continued)

OTHER PUBLICATIONS

European Search Report dated May 13, 2011 for EP Application No. 10180122.3, which corresponds to U.S. Appl. No. 12/860,560.

(Continued)

*Primary Examiner* — Warner Wong
(74) *Attorney, Agent, or Firm* — H.C. Park & Associates, PLC

(57) ABSTRACT

A communication terminal captures an image of a device having a local area wireless communication function, displays the image on a screen, and performs local area wireless communications with the device while further displaying data stored in the device on the screen.

27 Claims, 6 Drawing Sheets

(56) References Cited

FOREIGN PATENT DOCUMENTS

| KR | 10-0732839 | 6/2007 |
|---|---|---|
| KR | 1020080098273 | 11/2008 |
| KR | 10-0911937 | 8/2009 |
| KR | 1020090084634 | 8/2009 |
| WO | 03/094545 | 11/2003 |

OTHER PUBLICATIONS

Jangho Lee, et al., "A Unified Remote Console Based on Augmented Reality in a Home Network Environment", Consumer Electronics, 2007, ICCE 2007, Digest of Technical Papers, Jan. 1, 2007, pp. 1-2.
Naohiko Kohtake, et al., "StateSnap: A Snapshot-based Interface for State-Reproductable Operation of Networked Appliances", Mobile and Ubiquitous Systems: Networking and Services (MobiQuitous '05), Jul. 17 2005, pp. 443-453.
Hans Gellersen, et al., "Supporting device discovery and spontaneous interaction with spatial references", Personal and Ubiquitous Computing, Jul. 3, 2008, pp. 255-264.
Genta Suzuki, et al. "u-Photo: Interacting with Pervasive Services using Digital Still Images", Internet Citation (http://www.ht.sfc.keio.ac.jp/{genta/Pervasive2005.pdf)—retrieved on Apr. 15, 2011, pp. 190-207.
Junyi Zhou, et al. "RFID localization algorithms and applications—a review", Journal of Intelligent Manufacturing, Aug. 28, 2008, pp. 695-707.
Yutaka Sakane, et al, "An Extended Desktop Environment Using Camera Images", Proceedings of the Japan Society for Software Science and Technology SIGOOC 1998 Workshop on Systems for Programming and Applications, Mar. 25-27, 1998.

* cited by examiner

COMMUNICATION TERMINAL AND METHOD FOR DATA TRANSMISSION

CROSS-REFERENCE TO RELATED APPLICATION

This application claims priority from and the benefit of Korean Patent Application No. 10-2010-0008321, filed on Jan. 29, 2010, which is hereby incorporated by reference for all purposes as if fully set forth herein.

BACKGROUND

1. Field

The following description relates to a communication terminal and a data transmission method thereof.

2. Discussion of the Background

In general, a local area wireless communication technology is widely used to perform data transmission by between wireless devices positioned within a local area. In such is local area wireless communication technology, wireless communications are performed between devices using Bluetooth®, Zigbee®, Wi-fi, IrDA, and the like.

Conventionally, when data is transmitted between devices performing local area wireless communications, the data is transmitted between the devices through a one-to-one communication connection. Therefore, in order to transmit data of any one device to a plurality of correspondent devices, the data is transmitted by individually performing communication connections with each of the respective devices.

Also, when data is transmitted between devices performing local area wireless communications, a series of processes for selecting a correspondent device and selecting data to be transmitted may not be intuitive to a user.

SUMMARY

Exemplary embodiments of the present invention provide a communication terminal which captures an image of a device and displays the image of the device on a screen, the device having a local area wireless communication function, and performs local area wireless communications with the device while displaying data stored in the device the screen, and a method for data transmission of the communication terminal.

Additional features of the invention will be set forth in the description which follows, and in part will be apparent from the description, or may be learned by practice of the invention.

An exemplary embodiment provides a communication terminal including an image photographing unit to capture an image of a device; a communication unit to perform local area wireless communications with the device; a storage unit to store data received from the is device; an image output unit to display the capture image of the device; and a control unit to perform data processing so that data information corresponding to the received data stored in the storage unit is displayed on the image output unit.

An exemplary embodiment provides a method for data transmission of a communication terminal, which includes displaying a captured image of a device for transmission, the device for transmission having a local area wireless communication function; performing local area communications with the device; matching data file information stored in the device received through the local area wireless communications with the captured image of the device; and displaying the matched data file information.

An exemplary embodiment provides a communication terminal including an image photographing unit to capture a real-time image of a device; and an image output unit to display the real-time image and data of the device.

An exemplary embodiment provides a communication terminal including an image photographing unit to capture a first real-time image of a first device and a second real-time image of second device; an image output unit to display the first real-time image, the second real-time image, first data of the first device, and second data of the second device; and a control unit to match the first data with the first device and the second data with the second device.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
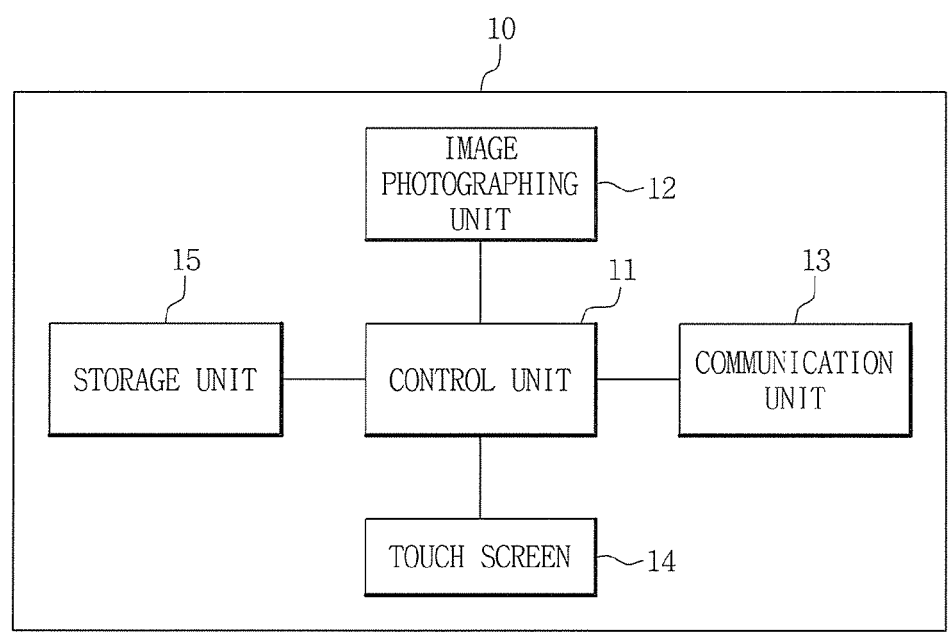
FIG. 1 is a block diagram of a communication terminal according to an exemplary embodiment.

Exemplary embodiments now are more fully described hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the is context clearly indicates otherwise. Furthermore, the use of the terms "a", "an", etc. does not denote a limitation of quantity, but rather denotes the presence of at least one of the referenced item. The use of the terms "first", "second", and the like does not imply any particular order, but they are included to identify individual elements. Moreover, the use of the terms "first", "second", etc. does not denote any order or importance, but rather the terms "first", "second", etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

FIG. 1 is a block diagram of a communication terminal according to an exemplary embodiment. Referring to FIG. 1, a communication terminal 10 includes a control unit 11, an image photographing unit 12, a communication unit 13, a touch screen 14, and a storage unit 15. The image photographing unit 12 photographs or captures an image under the control of the control unit 11, and provides the photographed or captured image to the control unit 11. The is communication unit 13 performs wireless communications under the control of the control unit 11. Specifically, the communication unit 13 performs local area wireless communications with other devices, which have a local area wireless function, positioned in the vicinity thereof. The touch screen 14 displays the image photographed or captured by the image photographing unit 12 under the control of the control unit 11, receives an instruction inputted by a user's touch input, and provides the received instruction to the control unit 11. The storage unit 15 stores various data and programs for driving the communication terminal 10, and provides the stored data and programs to the control unit 11. The control unit 11 controls various operations of the communication terminal 10 by controlling the image photographing unit 12, the communication unit 13, the touch screen 14, and the storage unit 15.

The control unit 11 performs control processing for data transmission with local area wireless communication devices that are present in the vicinity of the communication terminal 10. Specifically, the control unit 11 recognizes local area wireless communication devices photographed by the image photographing unit 12, and detects the kind and local area wireless communication mode of each of the recognized devices. Then, the control unit 11 matches data file information stored in the photographed device and displays the matched data file information on a screen of the touch screen 14 on which the other photographed device is displayed. That is, the control unit 11 can perform control processing in which data files of a device for transmission, selected through a touch on the screen of the touch screen 14, are transmitted to a device for reception, selected through a touch on the screen of the touch screen 14.

The touch screen 14 may display the photographed devices using augmented reality. For example, if the image photographing unit 12 captures an image of a device, the is touch screen 14 may display a real or real-time image of the device as well as data files of the displayed device.

As such, the control unit 11 displays devices photographed by the image photographing unit 12 and data files of each of the photographed devices on a screen of the touch screen 14, and enables data files to be transmitted between the devices based on a user's instruction through the screen of the touch screen 14. As a result, the communication terminal 10 allows a user to intuitively select a device through a touch on the screen of the touch screen 14 so that a desired data can be conveniently transmitted to a desired device.

The control unit 11 controls the image photographing unit 12 to photograph devices having the local area wireless communication function and to display images of the photographed devices on a screen of the touch screen 14. The control unit 11 may display a menu for selecting the entry into a data transmission mode in a region on the screen of the touch screen 14. If a user selects the menu for selecting the entry into the data transmission mode, the control unit 11 performs the entry into the data transmission mode.

In the data transmission mode, the control unit 11 performs processing for recognizing devices for local area wireless communication selected through the touch screen 14. Specifically, the control unit 11 may recognize the photographed device for local area wireless communication using object recognition information obtained through image recognition of the photographed device and local area wireless communication device information (containing a model name, a unique ID, and the like) obtained through local area wireless communications with the photographed device. The control unit 11 detects the kind and the local area wireless communication mode of the photographed device, using the obtained local area wireless communication device information. Specifically, the control unit 11 may detect the kind and the is local area wireless communication mode of the photographed device by checking information on the kind and the local area wireless communication mode of each of the devices stored in the storage unit 15 using the obtained local area wireless communication device information.

The control unit 11 may recognize an object by recognizing the image of the photographed device using an image recognition technique, such as a pattern recognition technique or feature-based geometric technique.

If the control unit 11 recognizes the photographed device based on the pattern recognition technique, the control unit 11 may recognize the photographed device using a method for previously collecting the shapes of local area wireless communication devices for recognition, storing the collected shapes in the storage unit 15, and searching a shape in the image of the device photographed by the image photographing unit 12 corresponding to one of the stored shapes.

When the control unit 11 recognizes the photographed device based on the feature-based geometric technique, the control unit 11 may recognize the photographed device using a method for previously extracting features, such as a distribution of individual points and a continuous curve or connected portion, that are present in the image of a local area wireless communication devices for recognition, storing the extracted features in the storage unit 15, and searching features in the image of the device photographed by the image photographing unit 12 corresponding to the stored features.

Figure 5:
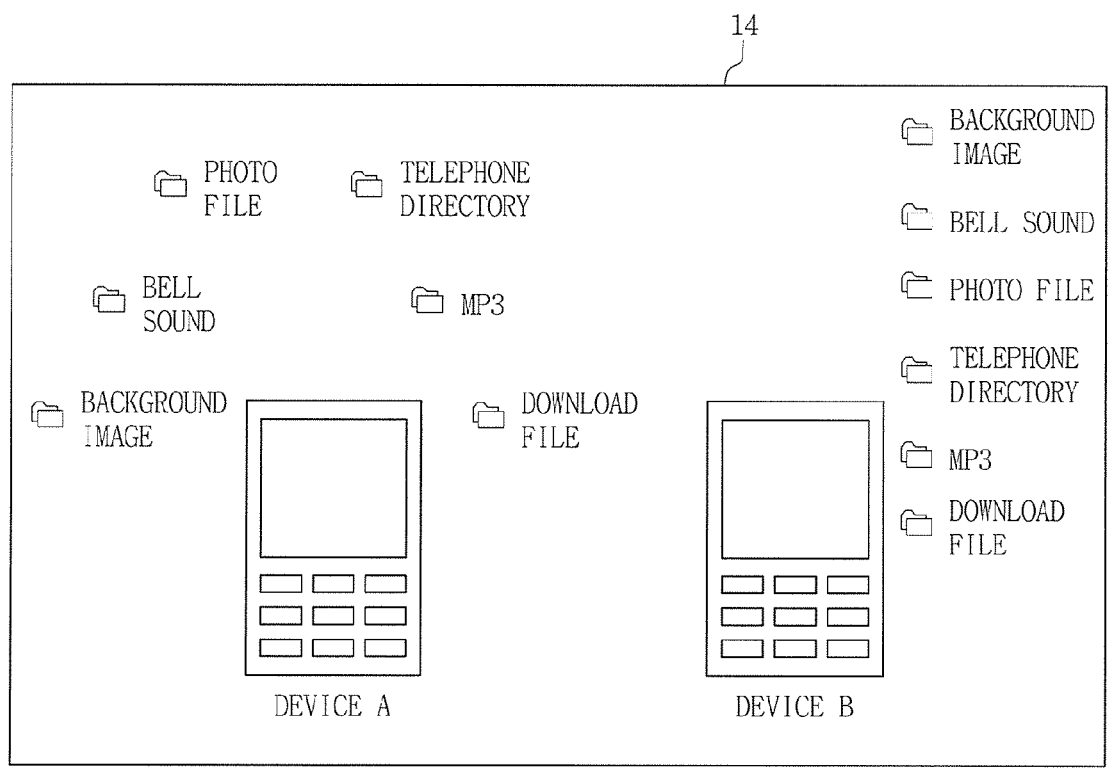

The control unit 11 performs object recognition of a photographed device through image recognition, and obtains local area wireless communication device information (including a model name, a unique ID, and the like) of a device photographed through local area wireless communications with the photographed device. Then, the control unit 11 compares local area is wireless communication device information of the photographed device and the device photographed through local area wireless communications with the photographed device. As a result, if it is determined that the local area wireless communication device information of the photographed device to which the object recognition is performed and the photographed device correspond to each other, the control unit 11 matches and displays data file information of the photographed device, obtained through local area wireless communications by the communication unit 13, on a screen of the touch screen 14. In this case, the data file information may be displayed as illustrated in FIG. 5. Further, the data file information may be displayed using augmented reality as described above.

If a user selects a data file of a device for transmission and a device for reception on the screen of the touch screen 14 in the state that the data file information of the photographed device is displayed using the augmented reality on the screen of the touch screen 14 on which the photographed device is displayed, the control unit 11 controls the communication unit 13 to transmit the selected data file to the device for reception through local area wireless communications. If the user selects a data file, which is to be transmitted, of a device for transmission and a device for reception on the screen of the touch screen 14, the user may select the data file of the device for transmission and the device for reception by dragging the data file to be transmitted to the device for reception. At this time, if the user selects a device for transmission and a data file on the corresponding screen of the touch screen 14, the control unit 11 may receive the corresponding data file transmitted from the device for transmission that stores the corresponding data file through local area wireless communications by the communication unit 13 and may store the received data file in the storage unit 15. Further, if the user selects a device for reception on the screen of the touch screen 14, the control unit 11 may is extract the data file stored in the storage unit 15 to transmit the extracted data file to the device for reception through local area wireless communications by the communication unit 13.

Figure 6:
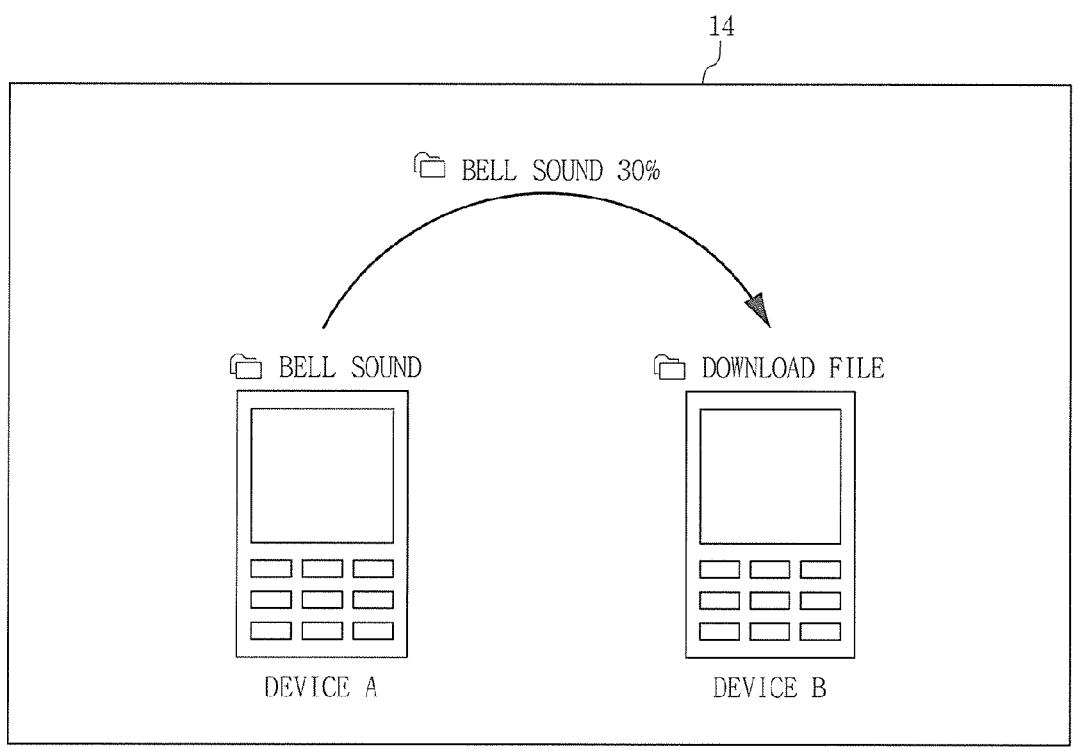

If the control unit 11 transmits the selected data file to the device for reception, the progress of transmitting the corresponding data file is displayed on the screen of the touch screen 14 as illustrated in FIG. 6.

If the control unit 11 recognizes a plurality of the same devices by performing object recognition through image recognition, it compares local area wireless communication device information (including a model name, a unique ID, and the like) obtained by local area wireless communications with the devices that are present in the vicinity of the communication terminal 10 and the device to which the object recognition is performed. Then, the control unit 11 displays a candidate device on a screen of the touch screen 14, and performs local area wireless communications with the candidate device selected on the screen of the touch screen 14. If the local area wireless communications are successful, the control unit 11 may inform the user that the correspondent device is recognized by changing the display of the device to which the object recognition is performed, i.e., by displaying a success indicator.

If the control unit 11 recognizes a plurality of the same devices by performing object recognition through image recognition, the control unit 11 compares local area wireless communication device information (including a model name, a unique ID, and the like) obtained by local area wireless communications with devices that are present in the vicinity of the communication terminal 10 and the device to which the object recognition is performed. Then, the control unit 11 sequentially performs local area wireless communications with candidate devices through the communication unit 13. If the local area wireless communications are successful, the control unit 11 may inform the user that the correspondent device is recognized by changing the display of the device to which the object recognition is performed, i.e., by displaying a success indicator.

If the control unit 11 performs processing for recognizing devices photographed by the image photographing unit 12, the control unit 11 may recognize the positions of the photographed devices using a triangular surveying technique. Specifically, three antennas are disposed in a triangular shape in the communication terminal 10, and the control unit 11 receives local area wireless signals transmitted from the photographed devices through the communication unit 13 so as to perform a triangular survey. Thus, the control unit 11 may recognize the positions of the photographed devices. In the state that the control unit 11 recognizes the positions of the photographed devices, the control unit 11 receives data file information transmitted by performing local area wireless communications with the corresponding device through the communication unit 13, and matches the received data file information together with the device displayed to display the matched data file information on the screen of the touch screen 14 using the augmented reality.

If the control unit 11 performs processing for recognizing devices photographed by the image photographing unit 12, the control unit 11 may recognize the positions of the corresponding devices using GPS positioning. In order to perform the GPS positioning, a GPS receiving unit for GPS positioning may be additionally included in the communication terminal 10.

If the control unit 11 performs processing for recognizing devices photographed by the image photographing unit 12, the control unit 11 may recognize the photographed devices using human body communications or directional antennas.

If the control unit 11 performs processing for recognizing devices photographed by the image photographing unit 12 using the human body communications, a user clicks one of the photographed devices displayed on the screen of the touch screen 14 of the communication terminal 10, and allows the other hand with which the corresponding communication terminal 10 is held to come in contact with the clicked device, thereby performing the human body communications through a user's body. Thus, the control unit 11 receives data file information from the corresponding device through the human body communications, and displays the received data file information together with the device displayed on the screen of the touch screen 14 using the augmented reality. In order to recognize the device through the human body communications, a function of performing the human body communications may be additionally provided to the communication unit 13.

When the control unit 11 performs processing for recognizing devices photographed by the image photographing unit 12 using the directional antennas, communicable directional antennas are disposed in a specified direction in the communication terminal 10, and local area wireless communications are performed with the devices through the directional antennas in a viewing angle range of the image photographing unit 12. Then, the control unit detects the direction matched to a corresponding device and recognizes the position of the corresponding device. Thus, the control unit 11 receives data file information from the corresponding device through local area wireless communications, and displays the received data file information together with the device displayed on the screen of the touch screen 14 using the augmented reality.

A function of performing local area wireless communications using a plurality of local area wireless communication technologies is provided to the communication unit 13 of the communication terminal 10, so that the control unit 11 can control the communication unit 13 to perform local area wireless communications between devices using the various local area wireless communication technologies. As such, the control unit 11 controls the communication unit 13 to perform local area wireless communications using supportable local area wireless communication technologies, so that it is possible to perform local area wireless communications with other devices that are present in the vicinity of the communication terminal 10.

Figure 2:
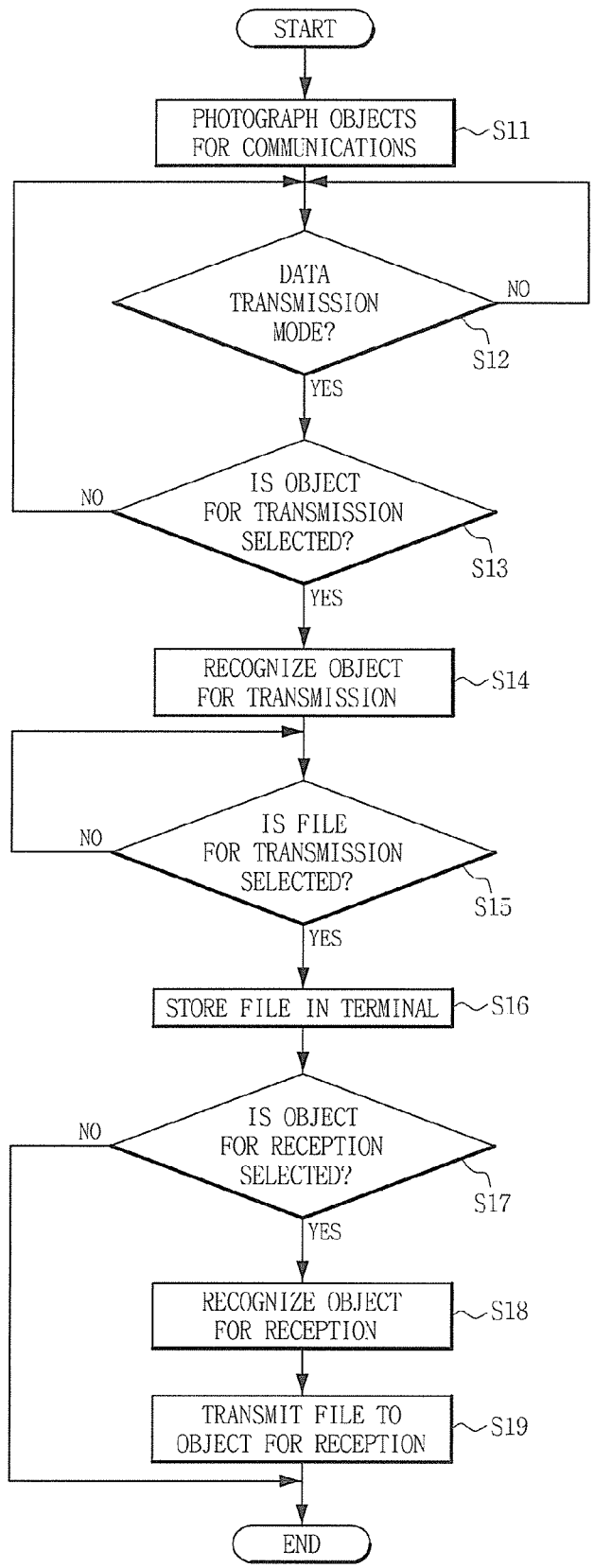
FIG. 2 is a flowchart illustrating a method for data transmission of the communication terminal according to an exemplary embodiment.
Figure 3:
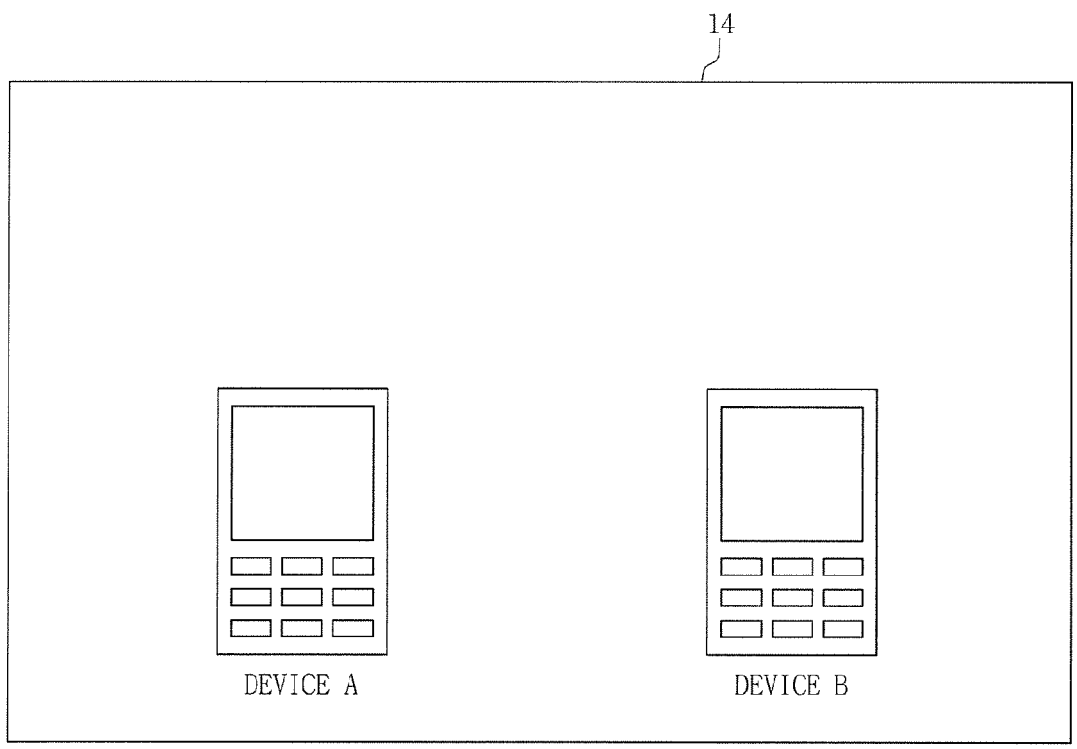
FIG. 3, FIG. 4, FIG. 5, and FIG. 6 are exemplary views illustrating screen displays of the communication terminal according to an exemplary embodiment.

FIG. 2 is a flowchart illustrating a method for data transmission of the communication terminal according to an exemplary embodiment. FIG. 3, FIG. 4, FIG. 5, and FIG. 6 are exemplary views illustrating screen displays of the communication terminal according to an exemplary embodiment Referring to FIG. 2, first, the control unit 11 controls the image photographing unit 12 to photograph devices based on a user's instruction, and displays images of the photographed devices on a screen of the touch screen 14. For example, as illustrated in FIG. 3, images of devices A and B may be displayed on the screen of the touch screen 14 (S11).

The control unit 11 may display a menu (not shown) for selecting the entry into a data transmission mode in a region on the screen of the touch screen 14. If a user selects the menu for selecting the entry into the data transmission mode, the control unit 11 performs the entry into the data transmission mode (S12).

If a device for transmission between the photographed devices displayed on the screen of the touch screen 14 is selected by a user's touch (S13), the control unit 11 performs object recognition through image recognition or performs processing for recognizing the photographed devices through local area wireless communication by the communication unit 13, thereby recognizing the selected device for transmission (S14). The control unit 11 detects the kind and the communication mode of the selected device for transmission and data files stored in is the selected device for transmission, and displays data file information of the selected device for transmission on the screen of the touch screen 14 on which the photographed device for transmission is displayed using the augmented reality.

Figure 4:
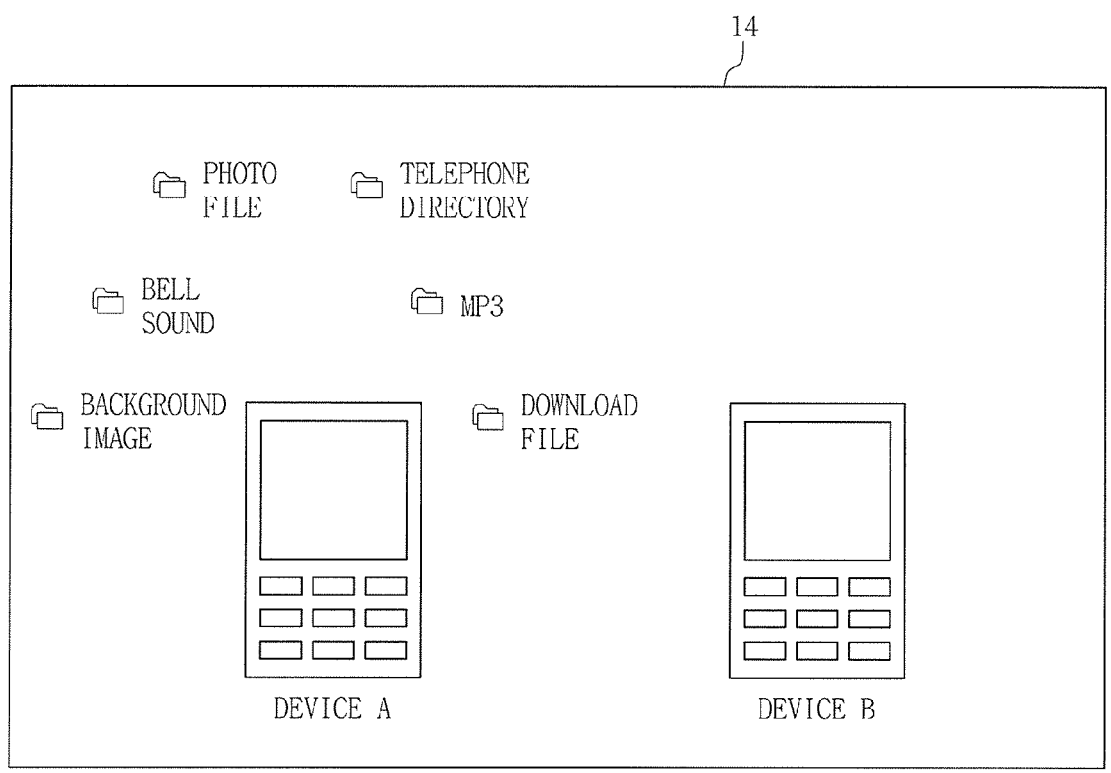

For example, as illustrated in FIG. 4, the control unit 11 may arrange and display data files, for example, background image, bell sound, photo file, telephone directory, MP3, download file, and the like, stored in device A, i.e., the device for transmission, around the image of the photographed device A. If a data file to be transmitted is selected through a user's touch among the data files of the device for transmission (the device A), which are displayed on the screen of the touch screen 14 using the augmented reality (S15), the control unit 11 receives the selected data file through local area wireless communications by the communication unit 13 to store the received data file in the storage unit 15 (S16).

If a device for reception is selected through a user's touch among the photographed devices displayed on the screen of the touch screen 14 (S17), the control unit 11 performs object recognition through image recognition or performs processing for recognizing the photographed devices through local area wireless communication by the communication unit 13, thereby recognizing the selected device for reception (S18). The control unit 11 detects the kind and the communication mode of the selected device for reception and data files stored in the selected device for reception, and displays data file information of the selected device for reception on the screen of the touch screen 14 on which the photographed device for reception is displayed using the augmented reality. For example, as illustrated in FIG. 5, the control unit 11 may arrange and display data files, for example, background image, bell sound, photo file, telephone directory, MP3, download file, and the like, stored in device B, i.e., the device for reception, around the image of the photographed device B.

The control unit 11 controls the communication unit 13 to transmit a data file of the device for transmission, stored in the storage unit 15, to the device for reception through local area wireless communications (S19). Before the data file is transmitted to the device for reception at the operation S19, the control unit 11 may select a data file of the device for reception, in which the transmitted data file is to be stored. At this time, the user drags a finger from the data file of the device for transmission to a specific data file of the device for reception on the screen of the touch screen 14, so that the data file of the device for transmission can be specified to the specific data file of the device for reception.

If the data file is transmitted to the device for reception, the control unit 11 may display the progress of transmitting the data file to the device for reception on the screen of the touch screen 14 using the augmented reality. For example, the control unit 11 may display the progress of transmitting the data file to the device for reception as illustrated in FIG. 6, i.e., a progress indicator may be displayed to show the progress of the transmitting of the data file. Specifically, if the data file "bell sound" of the device A is to be transmitted to the device B, the user drags the data file "bell sound" of the device A to the data file "download file" of the device B on the screen of the touch screen 14, so that the data file of the device A is transmitted to the device B and stored in the data file "download file". The control unit 11 may display the progress of transmitting the corresponding data file on the screen of the touch screen 14.

The control unit 11 displays the photographed devices and data file information of the photographed devices on the screen of the touch screen 14, and enables data files to be transmitted between the devices through a user's instruction on the screen of the touch screen 14.

If the communication terminal 10 transmits data between devices photographed by the image photographing unit 12, it has been described that the data transmission is performed is in a single direction, e.g., like when a data file of the device A is transmitted to the device B. However, the user may, for example, select a bidirectional transmission between the corresponding photographed devices through the touch screen 14 so that a data file of the device B can be transmitted to the device A while a data file of the device A is transmitted to the device B. Accordingly, the communication terminal 10 can relay, in real time, communications between the photographed devices.

If a device for transmission or device for reception is selected by the user on a screen of the touch screen 14, the communication terminal 10 performs local area wireless communications with the selected device, and receives data file information from the selected device so as to display the received data file information on the screen of the touch screen 14 using the augmented reality. However, the control unit 11 may collectively perform local area wireless communications with the respective devices displayed on the screen of the touch screen 14 and obtain data file information of the devices so that the obtained data file information can be collectively displayed on the screen of the touch screen using the augmented reality.

Further, the communication terminal 10 displays devices photographed by the image photographing unit 12 and data files of the photographed devices on a screen of the touch screen 14, and a user requests data transmission between the photographed devices through the touch screen 14. However, a display unit and an input unit may be individually provided to the communication terminal 10 so that data files of corresponding devices can be displayed using the augmented reality while displaying the photographed devices through the display unit. Also, the user can request data transmission between the corresponding devices through the input unit.

If the communication terminal 10 performs data transmission between devices photographed by the image photographing unit 12, the communication terminal 10 receives a is data file of a device for transmission, selected by a user, through local area wireless communications so as to store the received data file in the storage unit 15, and transmits the corresponding data file to a device for reception, selected by the user, through local area wireless communications. In this case, the data file stored in the storage unit 15 may be transmitted to a plurality of devices for reception, selected by the user. Thus, a data file of one device for transmission can be transmitted to a plurality of devices for reception.

Similarly, if the communication terminal 10 performs data transmission between devices photographed by the image photographing unit 12, the communication terminal 10 receives a data file stored in a plurality of devices for transmission, selected by a user, through local area wireless communications so as to store the received data files in the storage unit 15, and transmits the corresponding file to a plurality of devices for reception, selected by the user, through local area wireless communications. Thus, the data file stored in the plurality of devices for transmission is transmitted to the plurality of devices for reception so that it is possible to perform data transmission between a plurality of devices.

The communication terminal 10 may relay communications between the photographed devices by transmitting data between the photographed devices as described above.

The communication terminal 10 relays, for example, local area wireless communications between a television and a digital video recorder (DVR), both provided with a local area wireless communication function, and/or relays local area wireless communications between a television and a personal computer (PC). Thus, the communication terminal 10 transmits a received image signal of the television to the DVR and/or PC, and allows the corresponding image signal to be encoded and stored in the DVR and/or PC. Here, the is communication terminal 10 displays a device including a television and a DVR and/or PC, photographed by the image photographing unit 12, on a screen of the touch screen 14, and performs processing for recognizing the corresponding devices so that data files of the corresponding devices are displayed on the screen of the touch screen 14 using the augmented reality. Then, the communication terminal 10 receives a received image signal stored in a received image data file of the television, transmitted through local area wireless communications based on a user's instruction through the screen of the touch screen 14, and transmits the received image signal to the DVR and/or PC. Thus, the communication terminal 10 allows the received image signal of the television to be encoded and stored in the DVR and/or PC.

The communication terminal 10 relays, for example, local area wireless communications between terminals having a local area wireless communication function, so that it is possible to have a conversation or a game between the corresponding terminals. Here, the communication terminal 10 displays terminals photographed by the image photographing unit 12 on a screen of the touch screen 14, and performs processing for recognizing the corresponding terminals so that data files of the corresponding devices are displayed on the screen of the touch screen 14 using the augmented reality. Then, the communication terminal 10 bidirectionally transmits data for the conversation or game, transmitted/received between specific data files of the terminals based on a user's instruction through the screen of the touch screen 14.

The communication terminal 10 relays, for example, local area wireless communications between devices having a local area wireless communication function so that it is possible to perform control between the corresponding devices. Here, the communication terminal 10 displays devices photographed by the image photographing unit 12 on a screen of the is touch screen 14, and performs processing for recognizing the corresponding devices so that data files of the corresponding devices are displayed on the screen of the touch screen 14 using the augmented reality. Then, the communication terminal 10 bidirectionally transmits control data transmitted/received between specified data files of the devices based on a user's instruction through the screen of the touch screen 14, so that it is possible to perform control between the devices. For example, the communication terminal 10 displays images of a television and a terminal, photographed by the image photographing unit 12, on a screen of the touch screen 14, and performs processing for recognizing the correspond television so that data files of the corresponding television and the terminal are displayed on the screen of the touch screen 14 using the augmented reality. Then, the communication terminal 10 provides remote control data selected from the corresponding data files to the terminal based on a user's instruction through the screen of the touch screen 14, and receives the corresponding remote control data transmitted through a user's operation of the terminal so as to transmit the received remote control data to the television. Thus, the television can be remotely controlled by the terminal.

The communication terminal 10 relays, for example, local area wireless communications between devices having a local area wireless communication function at an event location, so that coupons or gifts can be provided to and used by participants of the event. Here, the communication terminal 10 displays a terminal of a gift provider and a terminal of a gift receiver on a screen of the touch screen 14, and performs processing for recognizing the corresponding terminals so that data files of the corresponding terminals are displayed on the screen of the touch screen 14 using the augmented reality. Then, the communication terminal 10 transmits a data file of a coupon or a gift, stored in the terminal of the gift provider, to the terminal of the gift receiver so that it is possible to provide the coupon or gift. Similarly, the is communication terminal 10 relays local area wireless communications between the devices provided with the local area wireless communication function at an event location, and transmits a data file of a coupon or a gift, stored in the terminal of the gift receiver, to the terminal of the gift provider so that it is possible to use a service corresponding to the corresponding coupon or gift.

The communication terminal 10 relays local area wireless communications between devices having a local area wireless communication function at a meeting, such as a seminar, so that data for sharing can be transmitted to participants. Here, the communication terminal 10 displays a terminal of a data provider and a terminal of a data receiver, photographed by the image photographing unit 12, on a screen of the touch screen 14, and performs processing for recognizing the corresponding terminals so that data files of the corresponding terminals are displayed on the screen of the touch screen 14 using the augmented reality. Then, the communication terminal 10 transmits a data file for sharing, stored in the terminal of the data provider, to the terminal of the data receiver based on a user's instruction through the screen of the touch screen 14 so that the data for sharing can be transmitted to the participants.

As described above, the communication terminal 10 recognizes devices having a local area wireless communication function, photographed by the image photographing unit 12, and displays data stored in corresponding devices through a screen of the touch screen 14. Then, the communication terminal 10 allows a user to request data transmission between the corresponding devices while identifying the data transmission through the screen.

According to the communication terminal and the method for data transmission thereof disclosed herein, devices having a local area wireless communication function are photographed and displayed on a screen, and local area wireless communications between the is photographed devices are performed by identifying data stored in the photographed devices.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A communication terminal, comprising:
   an image photographing unit to capture an image of a device;
   a communication unit to perform local area wireless communications with the device;
   a storage unit to store data received from the device;
   an image output unit to display the captured image of the device; and
   a control unit to identify a data file stored in a storage of the device, and to perform data processing so that data information corresponding to the data file stored in the storage of the device is displayed on the image output unit, the data information comprising an item indicating the data file stored in the storage of the device,
   wherein the control unit matches the data information with the captured image of the device to display the matched data information on the image output unit, and
   wherein the item comprises a first item indicating a first data file stored in the storage of the device and a second item indicating a second data file stored in the storage of the device.

2. The communication terminal according to claim 1, wherein
   the first item and the second item are displayed around the captured image of the device.

3. The communication terminal according to claim 1, further comprising an input unit to input commands to the control unit to relay data transmission/reception with the device through the communication unit and the storage unit.

4. The communication terminal according to claim 3, wherein the control unit relays the data transmission/reception to transmit the data file from the device for transmission, selected through the input unit, to another device for reception, selected through the input unit, and
   wherein the item indicating the data file is selected through the input unit.

5. The communication terminal according to claim 1, wherein the image output unit displays a progress indicator while the control unit relays data transmission to or from the device.

6. The communication terminal according to claim 1, wherein the image output unit displays the data information in association with the captured image of the device using augmented reality.

7. The communication terminal according to claim 1, wherein the data information indicates data stored in the storage of the device, and the data stored in the storage of the device comprises at least one of an image, an audio file, a photo file, and a telephone directory.

8. The communication terminal according to claim 4, wherein the image output unit displays a progress indicator while the control unit relays data transmission to or from the device.

9. The communication terminal according to claim 1, wherein the image output unit displays a success indicator to indicate successful local area wireless communications with the device.

10. The communication terminal according to claim 1, wherein the communication unit performs local area wireless communications over a plurality of local area wireless communication modes,
    the image photographing unit captures an image of another device for reception, and
    the control unit receives the data file stored in the storage of the device using a first local area wireless communication mode, and transmits the received data file to the device for reception using a second local wireless communication mode.

11. The communication terminal according to claim 1, wherein the captured image of the device is a real-time image.

12. The communication terminal according to claim 1, wherein the communication unit further comprises three antennas disposed in a triangular shape to perform a triangular survey for devices.

13. A method for data transmission of a communication terminal, comprising:
    displaying a captured image of a device for transmission, the device for transmission having a local area wireless communication function;
    performing local area communications with the device;
    identifying a data file stored in a storage of the device;
    matching data file information stored in the storage of the device received through the local area wireless communications with the captured image of the device; and
    displaying the matched data file information, the displayed data file information comprising an item indicating the data file stored in the storage of the device,
    wherein the item comprises a first item indicating a first data file stored in the storage of the device and a second item indicating a second data file stored in the storage of the device.

14. The method of claim 13, further comprising relaying data transmission of the data file from the device based on an inputted instruction associated with the item indicating the data file.

15. The method of claim 13, further comprising displaying a progress indicator of data transmission/reception to or from the device while relaying data transmission to or from the device.

16. The method of claim 13, wherein the data information indicates data stored in the storage of the device, and the data stored in the storage of the device comprises at least one of an image, an audio file, a photo file, and a telephone directory.

17. The method of claim 13, further comprising displaying a success indicator indicating successful local area wireless communications with the device.

18. The method of claim 13, wherein the captured image of the device is a real-time image.

19. A communication terminal, comprising:
    an image photographing unit to capture a real-time image of a device;
    a communication unit to perform a local area wireless communication with the device;
    a control unit to identify one or more data files stored in a storage of the device; and an image output unit to display the real-time image merged with the data information of the device corresponding to the data files stored in the storage of the device, the data information comprising a first item indicating a first data file of the data files and a second item indicating a second data file of the data files stored in the storage of the first device.

20. A communication terminal, comprising:
an image photographing unit to capture a first real-time image of a first device and a second real-time image of a second device;
an image output unit to concurrently display the first real-time image, the second real-time image, data file information of first data stored in the first device, and data file information of second data stored in the second device; and
a control unit to identify a first data file stored in a storage of the first device and a second data file stored in a storage of the second device, and to match the data file information of the first data with the first device and the data file information of the second data with the second device, the data file information of the first data comprising a first item indicating a name of the first data file stored in the storage of the first device, and the data file information of the second data comprising a second item indicating a name of the second data file stored in the storage of the second device,
wherein the control unit further identifies a third data file stored in the storage of the first device, and the data file information of the first data further comprises a third item indicating a name of the third data file stored in the storage of the first device.

21. The communication terminal of claim 20, wherein the control unit controls a data transmission of the first data file from the first device to the second device.

22. The communication terminal of claim 21, wherein the first data file is transmitted to the second device if the first item is dragged to the second real-time image of the second device, and
wherein the first data file is transmitted and stored in the second data file if the first item is dragged to the second item indicating the second data file.

23. The communication terminal according to claim 1, wherein the control unit performs object recognition of the device, and
wherein the control unit matches the data information with the captured image of the device to display the matched data information on the image output unit if local area wireless communication device information of the device corresponds to the device.

24. A method for controlling data communication of a device, comprising:
capturing a first real-time image of a first device and a second real-time image of a second device;
performing local area wireless communication with the first device and the second device and recognizing the first device and the second device;
obtaining data information corresponding to data stored in the first device, the data information comprising an item indicating a data file stored in a storage of the first device;
displaying the data information in association with the first real-time image and displaying the second real-time image on a display unit;
receiving a data transmitting request comprising a selection of the displayed item indicating the data file; and
controlling a data transmission of the data file between the first device and the second device if a data transmitting request is recognized,
wherein the data information is matched with the captured first real-time image of the first device to display the matched data information on the display unit, and
wherein the item comprises a first item indicating a first data file stored in the storage of the first device and a second item indicating a second data file stored in the storage of the first device.

25. The method of claim 24, wherein the data transmitting request is recognized if the displayed data information is selected and dragged to the second real-time image.

26. The method of claim 24, wherein the first device is recognized based on the first real-time image of the first device and information received by performing local area wireless communication with the first device.

27. The communication terminal of claim 20, further comprising:
a communication unit to perform a local area wireless communication with one or more wireless communication devices, and to receive data file information from the one or more wireless communication devices via the local area wireless communication, the received data file information comprising at least one of data file information of the first device and data file information of the second device,
wherein the control unit determines data file information of one of the wireless communication devices to be the data file information of the first device if local area wireless communication device information of the one of the wireless communication devices corresponds to the first device.

* * * * *